M. MURPHY.
Improvement in Globe-Valves.
No. 114,844.    Patented May 16, 1871
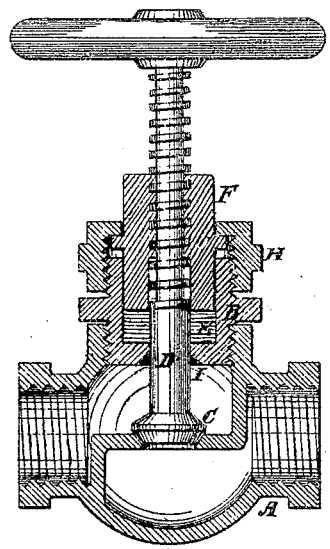
Witnesses.
Inventor.

United States Patent Office.

MATTHEW MURPHY, OF CHARLOTTE, NORTH CAROLINA.

Letters Patent No. 114,844, dated May 16, 1871; antedated May 15, 1871.

IMPROVEMENT IN GLOBE-VALVES.

The Schedule referred to in these Letters Patent and making part of the same.

*To all whom it may concern:*

Be it known that I, MATTHEW MURPHY, of Charlotte, in the county of Mecklenburg and State of North Carolina, have invented a new and useful Improvement in Globe-Valves; and I do hereby declare that the following is a full, clear, and exact description thereof, which will enable others skilled in the art to make and use the same, reference being had to the accompanying drawing forming part of this specification.

This invention relates to a new and useful improvement in globe-valves for steam, water, gas, and other purposes; and It consists in the construction, arrangement, and combination of parts as hereinafter described.

The accompanying drawing represents a vertical longitudinal section of a globe-valve constructed according to my invention.

A is the shell of the valve;

B is a chambered cap, which is screwed into the shell A, the end of which forms an upper seat for the valve;

C is the valve with two faces;

D is the valve-stem;

E is the chamber for packing the stem;

F is the nut through which the valve-stem works, the lower end of which acts as a stuffing-box on the packing in the chamber E;

G is a collar on the nut F; and

H is a thimble-nut, with an inward flange, which engages with the collar G and screws onto the gland B, as seen in the drawing.

This nut H holds the stem-nut F stationary, and draws it down onto the packing, so that all leakage is prevented, and the screw-thread of the stem is effectually protected from the action of the steam or other fluid or liquid.

By means of the upper valve-seat I the stem may be packed when there is a pressure of steam on the valve, and by raising the nuts F and H the valve may be ground to either seat without difficulty.

By this arrangement a durable and effective valve is made, not likely to get out of order, and one which obviates many of the objections to the globe-valves now in use.

Having thus described my invention,

I claim as new and desire to secure by Letters Patent—

The collared nut F G, combined, as described, with a cap, B, having the packing-chamber E, arranged as and for the purpose specified.

MATTHEW MURPHY.

Witnesses:
R. S. CULPEPER,
W. W. MYERS.